(12) United States Patent
Shi et al.

(10) Patent No.: US 12,019,342 B2
(45) Date of Patent: Jun. 25, 2024

(54) ARRAY SUBSTRATE AND DISPLAY PANEL

(71) Applicant: SHENZHEN CHINA STAR OPTOELECTRONICS SEMICONDUCTOR DISPLAY TECHNOLOGY CO., LTD, Shenzhen (CN)

(72) Inventors: Jiaojiao Shi, Shenzhen (CN); Hongyuan Xu, Shenzhen (CN); Li Guo, Shenzhen (CN); Dongming Su, Shenzhen (CN); Weiwei Zhang, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 67 days.

(21) Appl. No.: 17/789,696

(22) PCT Filed: May 20, 2022

(86) PCT No.: PCT/CN2022/094140
§ 371 (c)(1),
(2) Date: Jun. 28, 2022

(87) PCT Pub. No.: WO2023/216305
PCT Pub. Date: Nov. 16, 2023

(65) Prior Publication Data
US 2023/0359094 A1    Nov. 9, 2023

(30) Foreign Application Priority Data

May 7, 2022 (CN) .......................... 202210494354.0

(51) Int. Cl.
G02F 1/1362 (2006.01)
G02F 1/1343 (2006.01)
G02F 1/1368 (2006.01)

(52) U.S. Cl.
CPC .. *G02F 1/136286* (2013.01); *G02F 1/134363* (2013.01); *G02F 1/1368* (2013.01)

(58) Field of Classification Search
CPC .................... G02F 1/136286; G02F 1/134363
See application file for complete search history.

(56) References Cited

U.S. PATENT DOCUMENTS

2010/0225609 A1    9/2010  Huang et al.

FOREIGN PATENT DOCUMENTS

CN    102280443 A    12/2011
CN    111025801 A  *  4/2020    ....... G02F 1/134309
(Continued)

OTHER PUBLICATIONS

PCT International Search Report for International Application No. PCT/CN2022/094140, dated Dec. 20, 2022, 8pp.
(Continued)

*Primary Examiner* — Jessica M Merlin
(74) *Attorney, Agent, or Firm* — The Roy Gross Law Firm, LLC; Roy Gross

(57) ABSTRACT

An array substrate and a display panel are provided. The array substrate includes a plurality of data lines and scan lines intersecting to form a plurality of subpixel units. Each of the subpixel units includes a substrate, a common electrode layer, and an active layer. The active layer includes at least a first active layer and at least a second active layer. The first active layer is located in a thin-film transistor included in the array substrate, and at least one of the second active layers is not located at a position where the common electrode layer and the data line overlap.

20 Claims, 11 Drawing Sheets

(56) References Cited

FOREIGN PATENT DOCUMENTS

| CN | 111025801 A | 4/2020 |
|---|---|---|
| CN | 111582096 A | 8/2020 |

OTHER PUBLICATIONS

PCT Written Opinion of the International Search Authority for International Application No. PCT/CN2022/094140, dated Dec. 20, 2022, 7pp.

* cited by examiner

ARRAY SUBSTRATE AND DISPLAY PANEL

This application is a National Phase of PCT Patent Application No. PCT/CN2022/094140 having International filing date of May 20, 2022, which claims the benefit of priority of Chinese Application No. 202210494354.0, filed May 7, 2022, the contents of which are all incorporated herein by reference in their entirety.

BACKGROUND OF INVENTION

1. Field of Invention

The present application relates to a technical field of displays, and particularly to an array substrate and a display panel.

2. Related Art

In a field of displays, resolution of devices is generally indicated by 4K, 8K, etc., which represents a total number of pixel columns of the display devices. Currently, 8K products are generally developed and mass-produced based on five mask technology. In order to further reduce production costs, 8K products made with four-mask technology have been developed.

However, 8K products made with four masks have been encountering greater difficulty in technical development and are fraught with a serious horizontal crosstalk problem that are mainly because an active material at a junction of adjacent two subpixel units on an array substrate cannot be removed due to reduction of one mask. There is coupling capacitance between the active material, common electrode layers, and data signal metal lines. When positive and negative frames of image data are displayed, the coupling capacitance is asymmetric due to thickness of the active layer, which makes it difficult to cancel the coupling capacitance when the positive and negative frames of image data are displayed, thereby causing horizontal crosstalk.

A technical problem is that current 8K products made with four masks are fraught with the horizontal crosstalk problem caused by difficulty in cancelling the coupling capacitance during the display of the positive and negative frames.

SUMMARY OF INVENTION

An object of the present application is to provide an array substrate and a display panel to alleviate a problem with conventional 8K products made with four masks that horizontal crosstalk is caused because it is difficult to cancel coupling capacitance during the display of positive and negative frames.

In order to overcome the above-mentioned problem, the present application provides a technical solution as follows:

The present application provides an array substrate, including a plurality of data lines and a plurality of scan lines, the data lines and the scan lines intersecting to form a plurality of subpixel units, wherein each of the subpixel units includes: a substrate; a common electrode layer disposed on the substrate; and an active layer arranged on a side of the common electrode layer and comprising at least a first active layer and at least a second active layer, wherein the first active layer is located in a thin-film transistor included in the array substrate. At least one of the second active layers is not located at a position where the common electrode layer and the data line overlap.

In the array substrate of the present application, an electrode connection portion is disposed between the common electrode layers of adjacent ones of the subpixel units in a first direction, and the first direction is parallel to an extending direction of the scan lines.

In the array substrate of the present application, the electrode connection portion is disposed close to the thin-film transistor.

In the array substrate of the present application, an orthographic projection of at least one of the second active layers on the common electrode layer does not overlap the electrode connection portion.

In the array substrate of the present application, the common electrode layer includes a first electrode trace extending in the first direction and disposed close to the thin-film transistor.

In the array substrate of the present application, the first electrode traces of adjacent ones of the common electrodes are connected through the electrode connection portion in the first direction.

In the array substrate of the present application, the common electrode layer further includes at least a second electrode trace extending in a second direction, and the second direction is parallel to an extending direction of the data lines.

In the array substrate of the present application, the first electrode trace is connected to the second electrode trace.

In the array substrate of the present application, the subpixel unit further includes a pixel electrode layer disposed on the common electrode layer, and the second electrode trace is connected to a midpoint of the first electrode trace.

In the array substrate of the present application, an orthographic projection of the second electrode trace on the pixel electrode layer falls within the pixel electrode layer.

In the array substrate of the present application, the common electrode layer further includes a third electrode trace extending in the first direction.

In the array substrate of the present application, an orthographic projection of the third electrode trace on the pixel electrode layer falls within the pixel electrode layer.

In the array substrate of the present application, the third electrode trace and the second electrode trace are arranged to cross each other.

In the array substrate of the present application, a midpoint of the third electrode trace coincides with a midpoint of the second electrode trace.

In the array substrate of the present application, the common electrode layer further includes a fourth electrode trace extending in the first direction, and the fourth electrode trace is connected to at least one of the second electrode traces.

In the array substrate of the present application, the fourth electrode trace is disposed away from the thin-film transistor, and opposite ends of the fourth electrode trace do not overlap the data line.

In the array substrate of the present application, a number of the second electrode traces is two, and the two second electrode traces are electrically connected to opposite ends of the first electrode trace, respectively.

In the array substrate of the present application, opposite ends of the fourth electrode trace are connected to ends of the two second electrode traces away from the first electrode trace, respectively.

In the array substrate of the present application, a width of the first electrode trace in the second direction is less than a width of the second electrode trace in the first direction.

The present application further provides a display panel, including an opposite substrate, a liquid crystal layer, and the array substrate of claim 1. The array substrate and the opposite substrate are arranged at a distance from each other, and the liquid crystal layer is arranged between the array substrate and the opposite substrate.

The present application has advantageous effects as follows: in the present application, by setting the orthographic projection of at least one of the second active layers on the common electrode layer not to overlap the common electrode layer, that is, by removing part of the common electrode layer, a number of overlapping positions of the orthographic projection of the common electrode layer, the active layer, and the data line decreases, thereby reducing the asymmetry of the coupling capacitance between the second active layer and the common electrode layer and the data line due to the thickness of the active layer when the positive and negative frames are displayed, and effectively alleviating the horizontal crosstalk problem caused by the difficulty in cancelling the coupling capacitance when displaying the positive and negative frames.

BRIEF DESCRIPTION OF DRAWINGS

In order to better illustrate the technical solutions in the embodiments of the present application, the following will briefly introduce the accompanying drawings that need to be used in the description of the embodiments. Apparently, the accompanying drawings in the following description show merely some embodiments of the present invention, and a person skilled in the art may still derive other drawings from these accompanying drawings without creative efforts.

DESCRIPTION OF PREFERRED EMBODIMENTS

The technical solutions in the embodiments of the present application will be clearly and completely described below with reference to the drawings in the embodiments of the present application. Obviously, the described embodiments are only a part of the embodiments of the present application, rather than all the embodiments. Based on the embodiments in this application, all other embodiments obtained by those skilled in the art without creative efforts shall fall within the protection scope of this application. It should be understood that the specific embodiments described here are only used to illustrate the present application, and are not used to limit the present application. In this application, if no explanation is made to the contrary, the orientation words used, such as "upper" and "lower" usually refer to the upper and lower positions of the device in actual use or working state. Specifically, they refer to the direction of the drawings, and "inner" and "outer" refer to the outline of the device.

In a field of displays, resolution of devices is generally indicated by 4K, 8K, etc., which represents a total number of pixel columns of the display devices. Currently, 8K products are generally developed and mass-produced based on five mask technology. In order to further reduce production costs, 8K products made with four-mask technology have been developed. However, the technical development of 8K products made with four masks is relatively difficult, and there is a serious horizontal crosstalk problem. At this stage, a "just noticeable difference (JND)" value of 8K products made with five masks is generally 2.6, while the JND value of 8K products made with four masks is generally 2.8. Specifically, the "just noticeable difference" indicates a minimum threshold for distinguishing differences by visual observation. The larger the value is, the more obvious the display difference is, and the more serious the display abnormality is. Therefore, the horizontal crosstalk problem of 8K products made with four masks is more serious than that of 8K products made with five masks.

Figure 1:
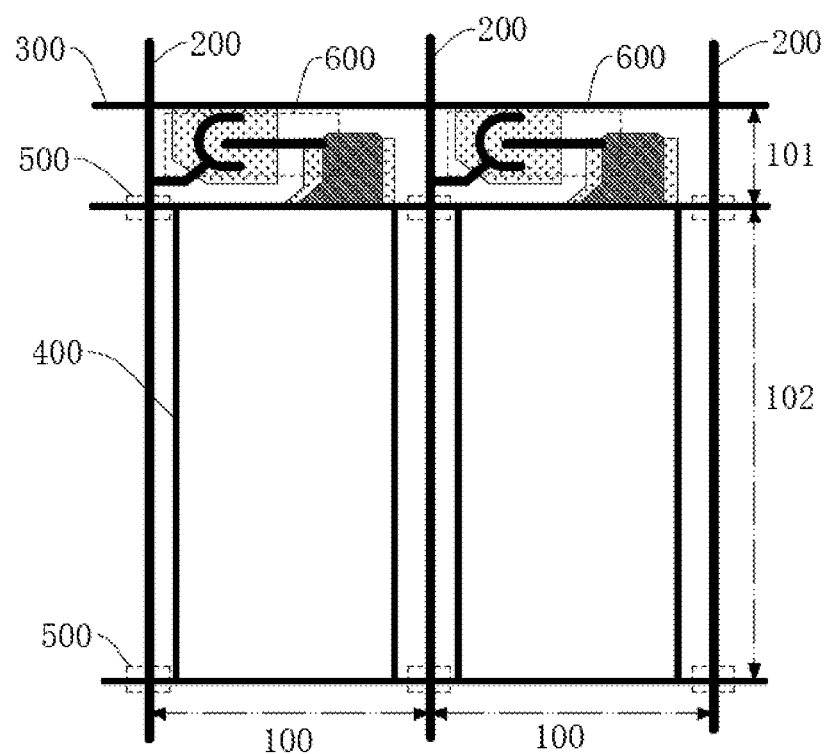
FIG. 1 is a schematic structural view of a pixel of an array substrate in the related art of the present application.

The horizontal crosstalk problem of 8K products made with four masks is mainly because an active layer at a junction of adjacent two subpixel units on an array substrate cannot be removed due to the reduction of one mask. FIG. 1 is a schematic view showing a planar structure of adjacent ones of subpixel units in a traditional 8K product made with four masks. Common electrode layers 400 and data lines 200 overlap at four vertex positions of each subpixel (i.e., orthographic projections overlap). An active layer 500 is disposed between the common electrode layer 400 and the data line 200, thereby creating coupling capacitance. When positive and negative frames are displayed, the coupling capacitance is asymmetric due to thickness of the active layer 500, which makes it difficult to cancel the coupling capacitance when the positive and negative frames are displayed, thereby causing horizontal crosstalk. The present application comes up with the following solutions based on the above technical problems.

In order to solve the above problems, the present application provides an array substrate. Referring to FIGS. 2 to 11, the array substrate includes a plurality of data lines 200 and a plurality of scan lines 300. The data lines 200 and the scan lines 300 intersect to form a plurality of subpixel units 100. Each of the subpixel units includes a substrate, a common electrode layer 400 disposed on the substrate, and an active layer 500 disposed on a side of the common electrode layer 400. The active layer 500 includes at least a first active layer and at least a second active layer 510. The first active layer (not shown) is located in a thin-film transistor 600 included in the array substrate, and an orthographic projection of the second active layer 510 on the data line 200 coincides with the data line 200. An orthographic projection of at least one of the second active layers 510 on the common electrode layer 400 does not overlap the electrode connection layer 400.

In the present application, by setting the orthographic projection of at least one of the second active layers 510 of the active layer 500 on the common electrode layer 400 not to overlap the common electrode layer 400, that is, by removing part of the common electrode layer 400, a number of overlapping positions of the orthographic projection of the common electrode layer 400, the active layer 500, and the data line 200 decreases, thereby reducing the asymmetry of the coupling capacitance between the second active layer 510 and the common electrode layer 400 and the data line 200 due to the thickness of the active layer 500 when the positive and negative frames are displayed, and effectively alleviating the horizontal crosstalk problem caused by the difficulty in cancelling the coupling capacitance when displaying the positive and negative frames.

The technical solution of the present application will now be described in combination with specific embodiments. It should be noted that the description order of the following embodiments is not intended to limit the preferred order of the embodiments.

Figure 2:
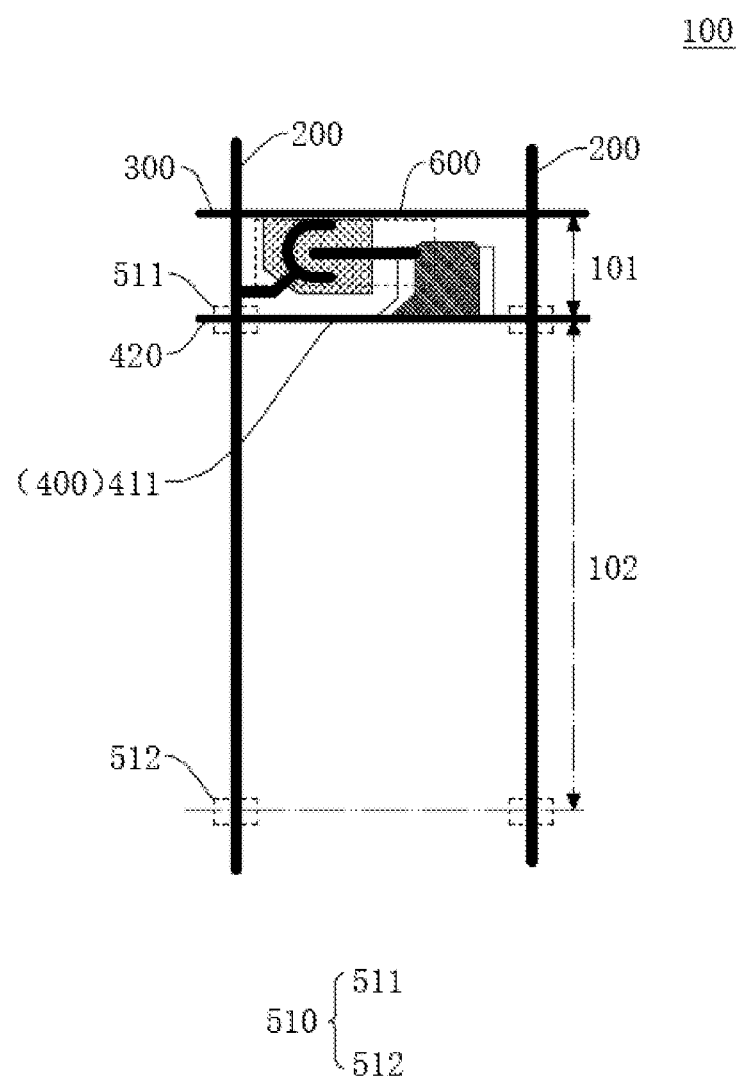
FIG. 2 is a schematic structural view of a first type of pixel of an array substrate of the present application.

Please refer to FIG. 2, which is a schematic structural view of a first type of pixel of an array substrate of the present application. In the array substrate of the present application, the array substrate may include a thin-film transistor region 101 and a pixel electrode region 102 located on at least one side of the thin-film transistor region 101. The thin-film transistor region 101 is provided with a thin-film transistor 600 for controlling switching of the subpixels. A pixel electrode layer (not shown) may be disposed in the pixel electrode region 102 and may be located above the common electrode layer 400.

In this embodiment, the thin-film transistor 600 may include a gate layer, a first active layer, and a source and drain layer. The gate layer may be electrically connected to the scan line 300, the first active layer may be insulated from the gate layer in different layers, and source and drain electrodes of the source and drain layer may be overlapped on both sides of the first active layer, respectively. The data line 200 may be electrically connected to the source/drain electrode, and the drain/source electrode may be electrically connected to a pixel electrode.

In this embodiment, the first active layer is a channel layer of the thin-film transistor 600, and the first active layer and the second active layer 510 may be disposed in a same layer. Specifically, when four mask processes are performed, one mask may be used to form the first active layer and the second active layer 510 at a same time.

In this embodiment, a plane position of the first active layer of the thin-film transistor 600 on the substrate is different from a plane position of the second active layer 510 on the substrate. Specifically, the first active layer is located in the thin-film transistor region 101 of the subpixel unit 100, and the second active layer 510 is located at a junction of adjacent ones of the subpixel units 100 arranged in the first direction.

Referring to FIG. 2, in this embodiment, in the first direction, an electrode connection portion 420 may be provided between the common electrode layers 400 of adjacent two of the subpixel units 100 to connect the common electrode layers 400 in the first direction into a whole, and then electrically connect with a common voltage terminal on the array substrate. The first direction is parallel to an extending direction of the scan line 300.

In this embodiment, an orthographic projection of at least one of the second active layers 510 on the common electrode layer 400 does not overlap the electrode connection layer 420. Specifically, taking one subpixel unit 100 as an example for illustration, a periphery of one subpixel unit 100 may be configured to correspond to four second active layers 510, and the four second active layers 510 may be located at four corner positions of the subpixel unit 100. Specifically, adjacent two of the subpixel units 100 disposed in the first direction may share two of the second active layers 510, and the two shared second active layers 510 are arranged in a second direction, which is parallel to an extending direction of the data lines 200.

In this embodiment, the second active layers 510 on the peripheral side of one of the subpixel units 100 can be grouped in pairs into a first active portion 511 and a second active portion 512 according to the arrangement orientation of the second active layer 510.

In this embodiment, two of the first active portions 511 may correspond to positions of the two electrode connection portions 420 on both sides of the subpixel unit 100, respectively. That is, the two first active portions 511 may be disposed on a borderline between the thin-film transistor region 101 and the pixel electrode region 102, and orthographic projections of the two first active portions 511 on the common electrode layer 400 overlap the two electrode connection portions 420 on the both sides of the subpixel unit 100.

In this embodiment, the two second active portions 512 may be located on a side of the pixel electrode region 102 away from the thin-film transistor region 101. In addition, extending directions and a connection direction of the two second active portions 512 may be parallel to the extending direction of the scan lines 300, i.e., the first direction. The orthographic projections of the two second active portions 512 on the common electrode layer 400 are located in an area outside the common electrode layer 400. In other words, in this embodiment, part of the common electrode layer 400 is removed at the positions of the second active portions 512, so that a situation that the positions of the second active portions 512 overlap with the data lines 200 and the common electrode layer 400 does not exist.

In this embodiment, through the above arrangement, a number of overlapping positions of the two data lines 200 on the both sides of the subpixel unit 100 with the four second active layers 510 and the common electrode layer 400 is changed from four to two. By means of the number of the overlapping positions of the data lines 200, the second active layers 510, and the common electrode layer 400 on the array substrate reduced by half, a number of coupling capacitance formed between the data lines 200, the second active layers 510, and the common electrode layer 400 is effectively reduced, thereby reducing the asymmetry of the coupling capacitance between the second active layers 510 and the common electrode layer 400 and the data lines 200 when displaying the positive and negative frames, thus effectively alleviating the horizontal crosstalk problem caused by the difficulty in cancelling the coupling capacitance when displaying the positive and negative frames.

In this embodiment, the common electrode layer 400 may be disposed on the substrate in a same layer as the gate layer. In this case, the active layer 500 may be disposed on a side of the common electrode layer 400 away from the substrate.

In this embodiment, the common electrode layer 400 may also be disposed in a same layer as the source and drain layer of the thin-film transistor 600. In this case, the active layer 500 can be disposed on a side of the common electrode layer 400 close to the substrate.

Referring to FIG. 2, in the array substrate of the present application, the electrode connection portion 420 may be disposed close to the thin-film transistor 600 of the array substrate. Preferably, the electrode connection portion 420 may be disposed in the first direction. In addition, the electrode connection portion 420 may be located on the borderline between the thin-film transistor region 101 of the array substrate and the pixel electrode region 102.

Referring to FIG. 2, in the array substrate of the present application, the common electrode layer 400 may include a first electrode trace 411 extending in the first direction and disposed close to the thin-film transistor 600. Preferably, the first electrode trace 411 may be located at a boundary between the thin-film transistor region 101 and the pixel electrode region 102.

In this embodiment, in the first direction, the first electrode traces 411 of the common electrode layers 400 of adjacent two of the subpixel units 100 are connected through the electrode connection portion 420. In the first direction, the first electrode traces 411 of the two adjacent common electrode layers 400 are connected to the electrode connection portion 420 in a middle to form a straight line extending in the first direction. Preferably, the electrode connection portion 420 can be integrally formed with the first electrode trace 411, that is, in the second direction, the first electrode trace 411 and the electrode connection portion 420 can be formed at a same time in a same process, and a width of the electrode connection portion 420 can be the same as a width of the first electrode trace 411.

In this embodiment, by arranging the common electrode layer 400 only at the boundary between the thin-film transistor region 101 and the pixel electrode region 102 (that is, the common electrode layer 400 only includes the first electrode trace 411), there is no common electrode layer 400 in the pixel electrode region 102 as well as no overlapping of the common electrode layer 400 with the second active layer 510 and the data line 200 in the pixel electrode region 102, so as to reduce the number of coupling capacitance between the data lines 200, the second active layers 510, and the common electrode layer 400, thereby reducing the asymmetry of the coupling capacitance between the second active layers 510 and the common electrode layer 400 and the data lines 200 when displaying the positive and negative frames.

Figure 3:
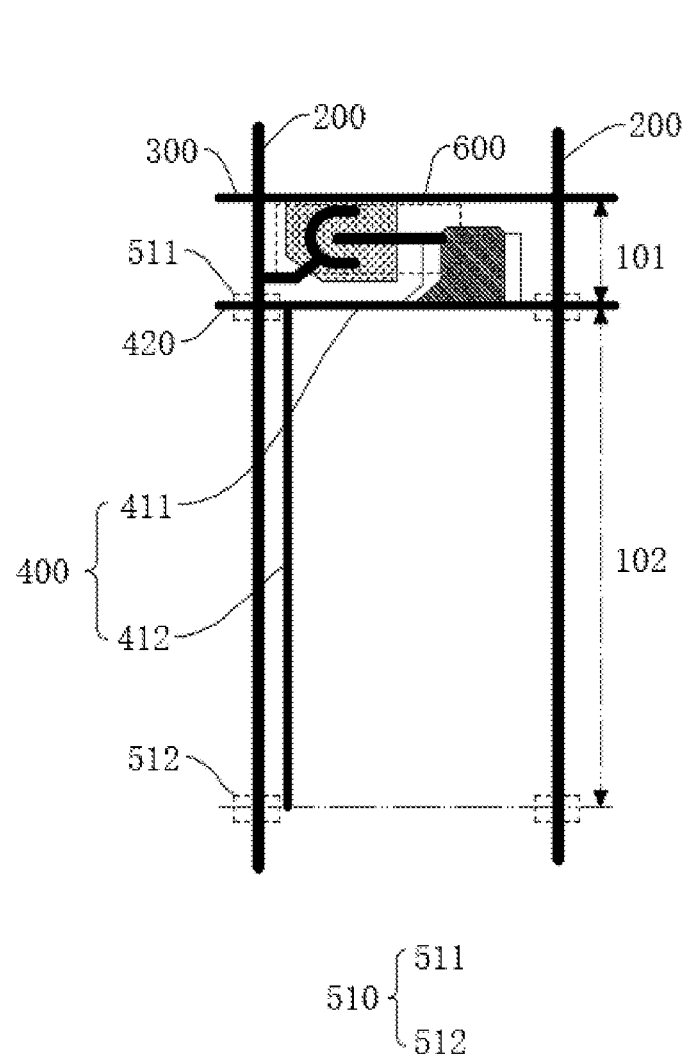
FIG. 3 is a schematic structural view of a second type of pixel of the array substrate of the present application.

Referring to FIG. 3, which is a schematic structural view of a second type of pixel of the array substrate of the present application, in the array substrate of the present application, the common electrode layer 400 further includes at least a second electrode trace 412 extending in the second direction, which is parallel to the extending direction of the data lines 200.

In this embodiment, the second electrode trace 412 may be located in the pixel electrode region 102. An orthographic projection of the second electrode trace 412 on the pixel electrode layer falls within the pixel electrode layer, and the second electrode trace 412 may be electrically connected to the first electrode trace 411.

In this embodiment, as shown in FIG. 3, a number of the second electrode traces 412 may be one, and the one second electrode trace 412 may be electrically connected to any position of the first electrode trace 411. For example, the second electrode trace 412 may be connected to an end of the first electrode trace 411. In this case, the second electrode trace 412 is located at an edge of the pixel electrode region 102.

Figure 4:
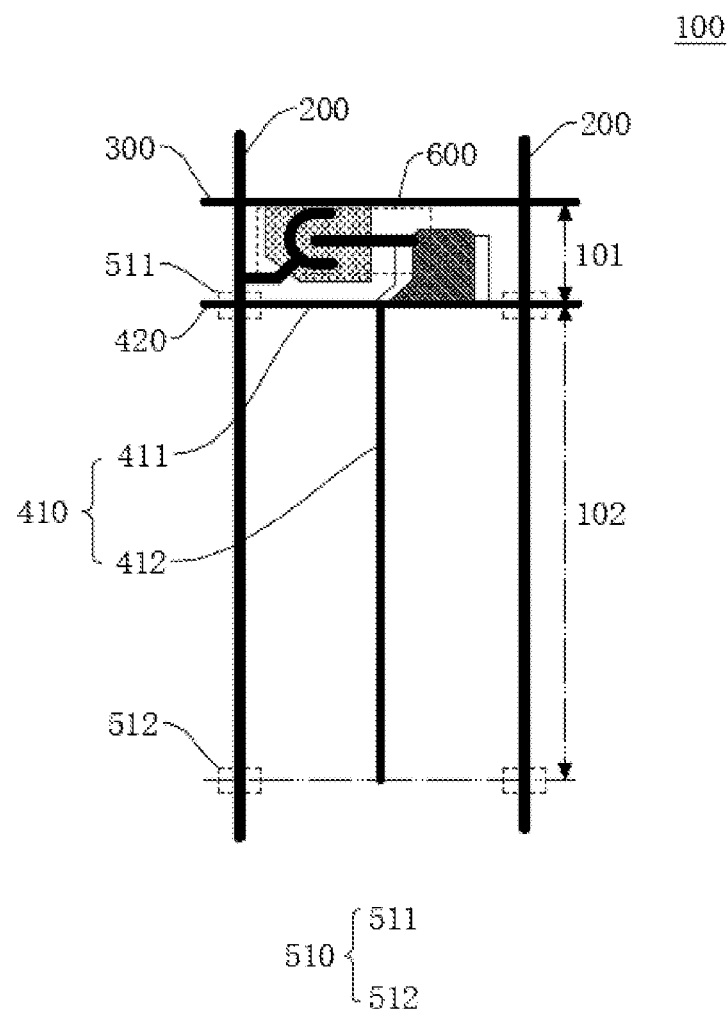
FIG. 4 is a schematic structural view of a third type of pixel of the array substrate of the present application.

In this embodiment, as shown in FIG. 4, which is a schematic structural view of a third type of pixel of the array substrate of the present application, the second electrode trace 412 may also be connected to a midpoint of the first electrode trace 411. In this case, the first electrode trace 411 and the second electrode trace 412 together form a "T"-shaped common electrode layer 400. Compared with a "horizontal line-shaped" common electrode layer 400 having only one first electrode trace 411, the "T"-shaped common electrode layer 400 can form a more uniform and stable electric field with the pixel electrode in the pixel electrode region 102, improving display uniformity and stability of a single subpixel unit 100.

Figure 5:
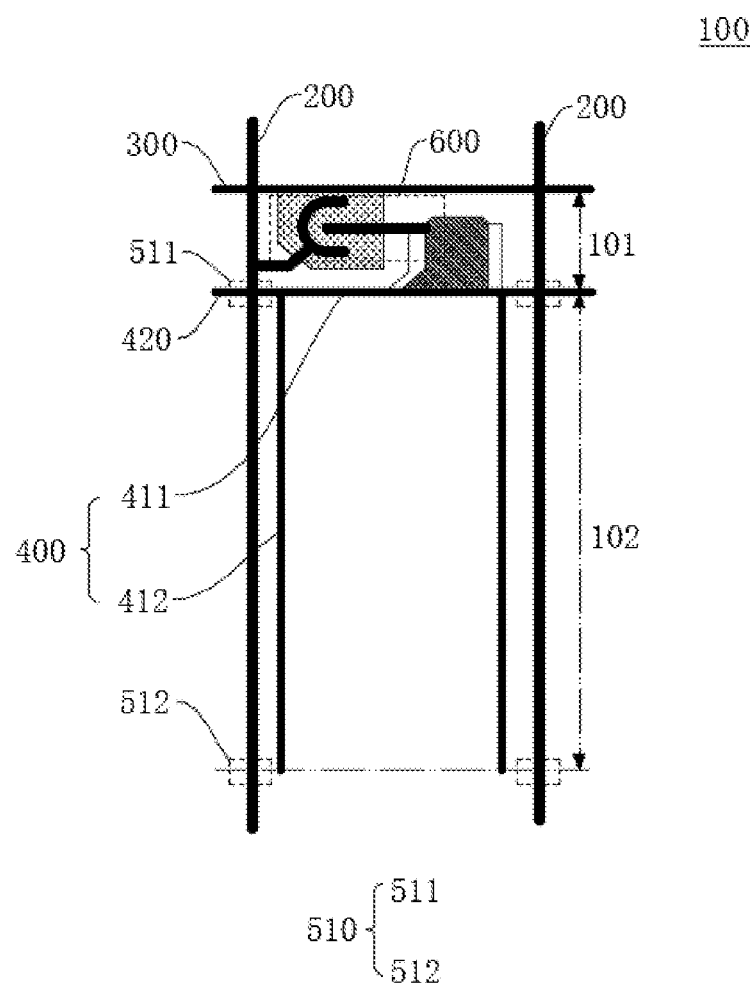
FIG. 5 is a schematic structural view of a fourth type of pixel of the array substrate of the present application.

In this embodiment, as shown in FIG. 5, which is a schematic structural view of a fourth type of pixel of the array substrate of the present application, the number of the second electrode traces 412 may also be two. The two second electrode traces 412 may be arranged in parallel to and connected to any two different positions on the first electrode trace 411. For example, the two second electrode traces 412 may be connected to two ends of the first electrode trace 411 in the first direction, respectively. In this case, the two second electrode traces 412 are located at edge positions on opposite sides of the pixel electrode region 102, respectively.

In this embodiment, the number of the second electrode traces 412 may also be greater than two, and more than two second electrode traces 412 may be connected to any different positions on the first electrode trace 411. This embodiment will not be repeated here.

In this embodiment, the common electrode layer 400 is configured to include the first electrode trace 411 and at least one second electrode trace 412, so that the common electrode layer 400 extends into the pixel electrode region 102. Compared with the single first electrode trace 411, the common electrode layer 400 in this embodiment can form a more balanced electric field between the pixel electrode region 102 and the pixel electrode, thereby providing a more stable and uniform pixel voltage for the subpixels, thus further improving a display effect.

Referring to FIG. 5, in the array substrate of the present application, a width of the first electrode trace 411 in the second direction may be less than a width of the second electrode trace 412 in the first direction. Since the electrode connection portion 420 can be integrally formed with the first electrode wiring 411, and the widths of the electrode connection portion 420 and the first electrode trace 411 in the second direction can be the same, in this embodiment, the width of the electrode connection portion 420 in the second direction may be less than the width of the second electrode trace 412 in the first direction.

That is to say, in this embodiment, by setting the width of the electrode connection portion 420 in the second direction to be smaller, an overlapping area of the electrode connection portion 420 with the second active layer 510 and the data line 200 can be reduced, so that the capacitance difference between the coupling capacitance between the electrode connection portion 420, the active layer 510, and the data line 200 caused by the displaying of the positive and negative frames is reduced, thereby alleviating the horizontal crosstalk problem.

Figure 6:
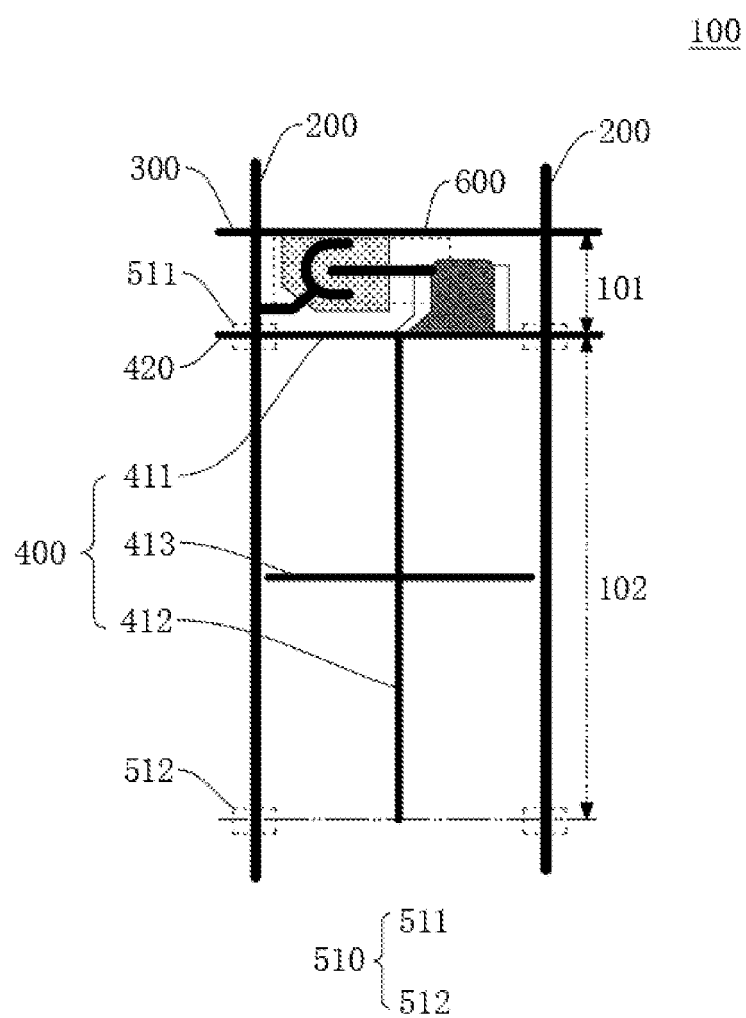
FIG. 6 is a schematic structural view of a fifth type of pixel of the array substrate of the present application.

Referring to FIG. 6, which is a schematic structural view of a fifth type of pixel of the array substrate of the present application, in the array substrate of the present application, the common electrode layer 400 may further include a third electrode trace 413 extending in the first direction. The third electrode trace 413 is located in the pixel electrode area 102 of the array substrate, so that the common electrode layer 400 can be disposed in the pixel electrode area 102 in the first direction, and pixel voltage uniformity in the pixel electrode region 102 is further improved.

In this embodiment, the third electrode trace 413 may be arranged to intersect the second electrode trace 412, and a midpoint of the third electrode trace 413 may coincide with a midpoint of the second electrode traces 412. In other words, the second electrode trace 412 is located in the pixel electrode region 102 along a center line in the second direction, and the third electrode trace 413 is located in the pixel electrode region 102 on the centerline in the first direction. In this case, the second electrode trace 412 and the third electrode trace 413 collectively form a cross-shaped electrode branch at the centerline of the pixel electrode region 102, which can further improve uniformity of the electric field formed by the common electrode layer 400 and the pixel electrode in the pixel electrode region 102, and further improves the display effect.

In this embodiment, opposite ends of the third electrode trace 413 in the first direction do not extend beyond the pixel electrode region 102 of the subpixel unit 100. In other words, the opposite ends of the third electrode trace 413 in the first direction do not overlap with the data line 200, that is, an orthographic projection of the data line 200 on the common electrode layer 400 does not overlap the third electrode trace 413.

Figure 7:
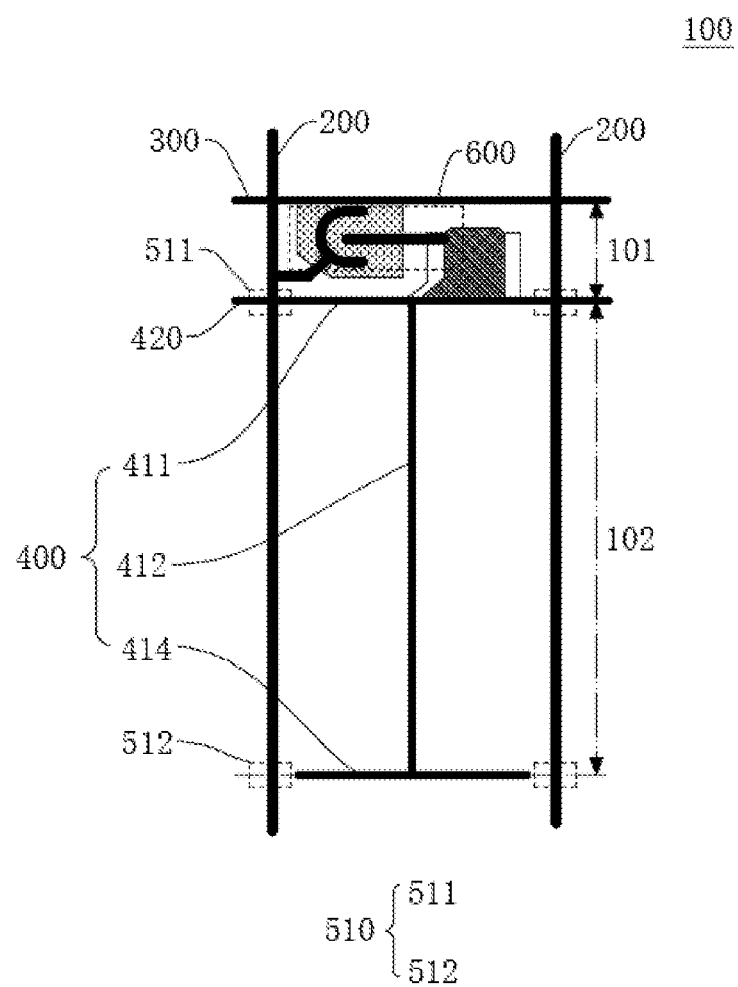
FIG. 7 is a schematic structural view of a sixth type of pixel of the array substrate of the present application.
Figure 8:
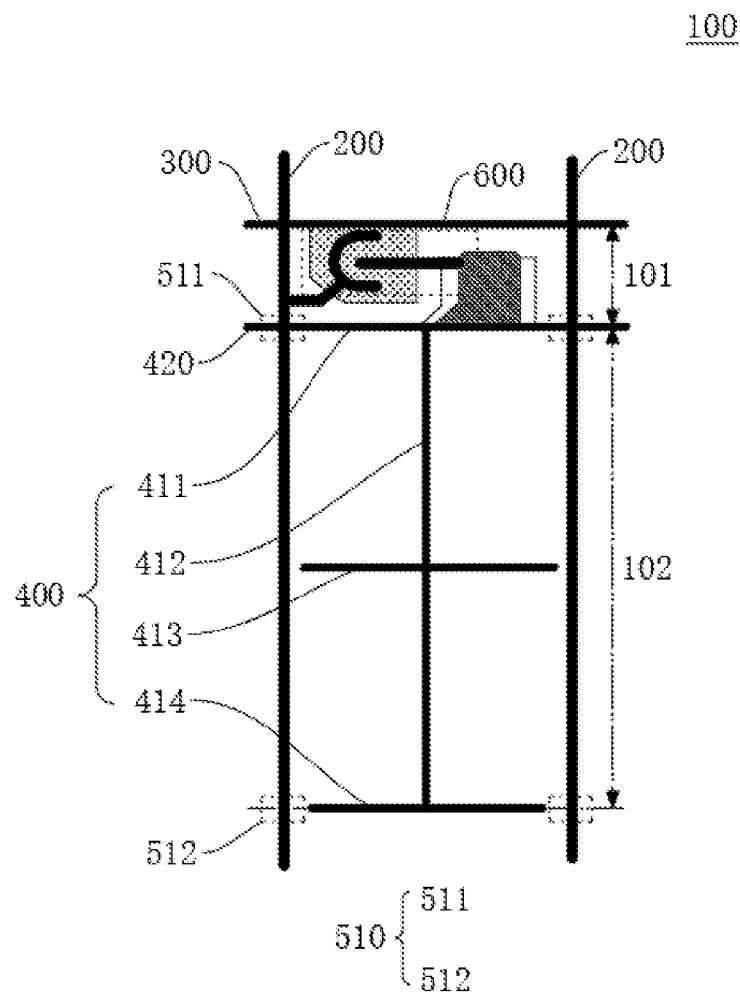
FIG. 8 is a schematic structural view of a seventh type of pixel of the array substrate of the present application.

Referring to FIG. 7 and FIG. 8, in the array substrate of the present application, the common electrode layer 400 may further include a fourth electrode trace 414 extending in the first direction and electrically connected to at least one of the second electrode traces 412, and the fourth electrode trace 414 is located in the pixel electrode region 102 of the array substrate.

In this embodiment, the fourth electrode trace 414 may be connected to an end of the second electrode trace 412 away from the first electrode trace 411. In other words, the fourth electrode trace 414 may be disposed in parallel with the first electrode trace 411 in the first direction and may be located at an edge of the pixel electrode region 102.

Referring to FIG. 7, which is a schematic structural view of a sixth type of pixel of the array substrate of the present application, in this embodiment, when the number of the second electrode trace 412 is one, the second electrode trace 412 may be located on the center line of the pixel electrode region 102 and the end of the second electrode trace 412 away from the first electrode trace 411 may be connected to a midpoint of the fourth electrode trace 414. In this case, the third electrode trace 413 is not disposed in the pixel electrode region 102, and the first electrode trace 411, the second electrode trace 412, and the fourth electrode trace 414 collectively form an "I"-shaped common electrode layer 400.

It should be noted that, in this embodiment, the fourth electrode trace 414 is located on the side of the pixel electrode region 102 away from the thin-film transistor region 101, and orthographic projections of the fourth electrode trace 414 and the second active layer 510 on the common electrode layer 400 do not overlap with each other.

Referring to FIG. 8, which is a schematic structural view of a seventh type of pixel of the array substrate of the present application, in this embodiment, the second electrode trace 412, the third electrode trace 413, and the fourth electrode trace 414 may be simultaneously disposed in the pixel electrode region 102. In this case, the pixel electrode region 102 can be divided into four regions by the first electrode trace 411, the second electrode trace 412, the third electrode trace 413, and the fourth electrode trace 414. An area of each of the four regions can be equal or unequal.

Figure 9:
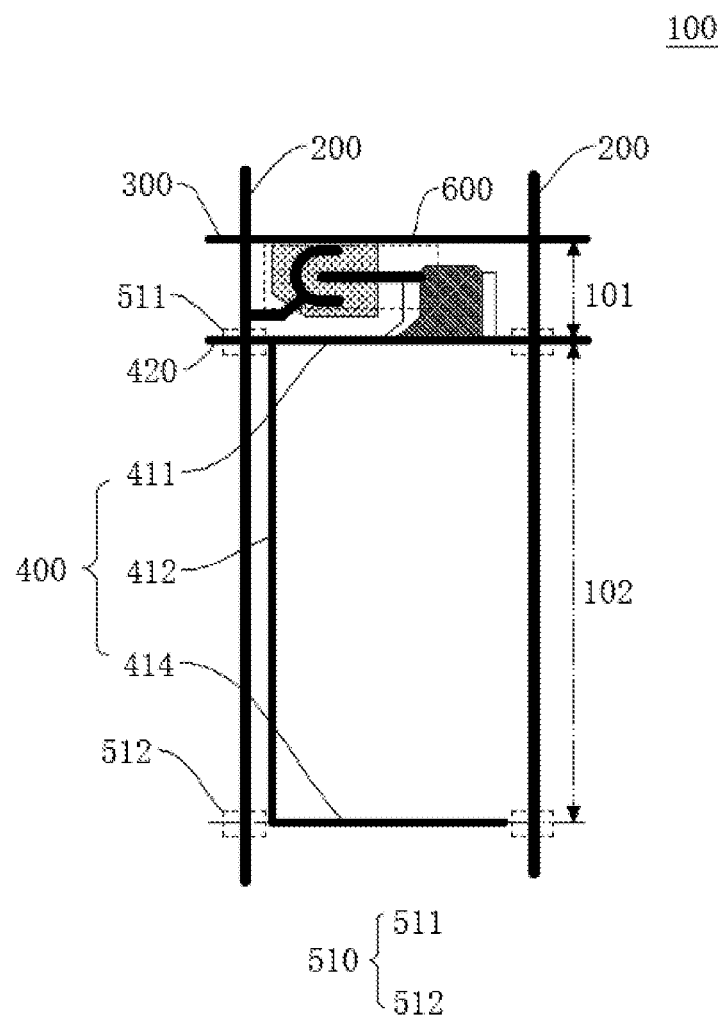
FIG. 9 is a schematic structural view of an eighth type of pixel of the array substrate of the present application.
Figure 10:
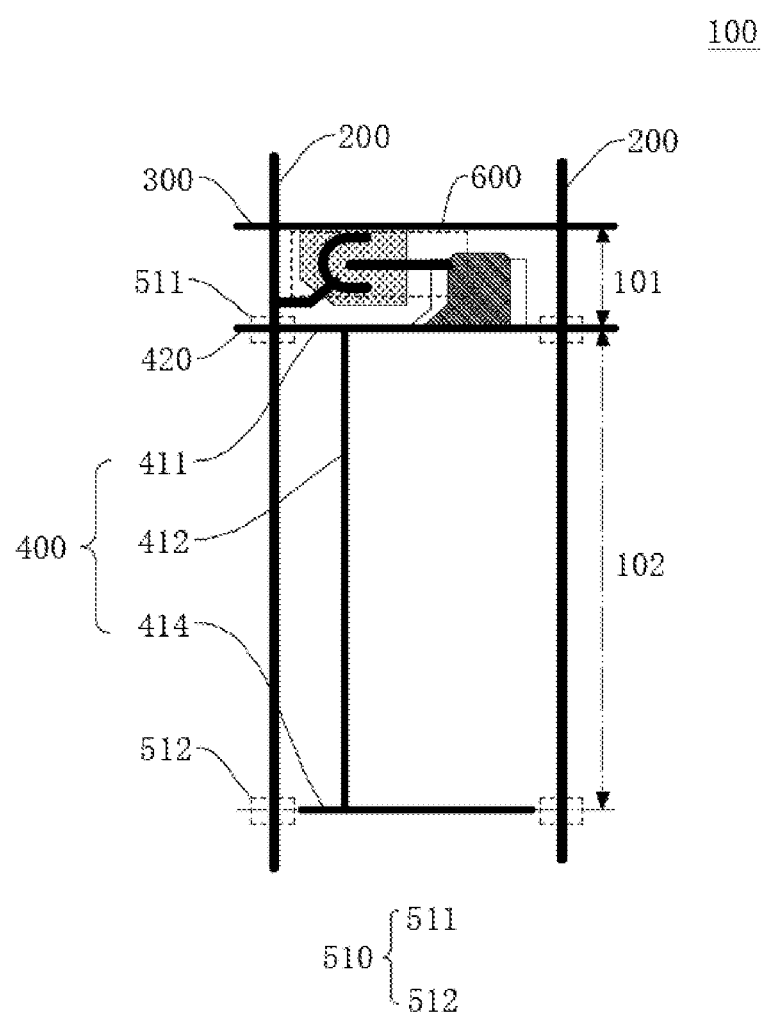
FIG. 10 is a schematic structural view of a ninth type of pixel of the array substrate of the present application.

Please refer to FIGS. 9 and 10, FIG. 9 is a schematic structural view of an eighth type of pixel of the array substrate of the array substrate of the present application, and FIG. 10 is a schematic structural view of a ninth type of pixel of the array substrate of the array substrate of the present application. In this embodiment, when a number of the second electrode trace 412 is one, the second electrode trace 412 may also be located at any position in the pixel electrode region 102, such as an edge position of the pixel electrode region 102, and this embodiment is only illustrated in FIGS. 9 and 10 here, and will not be described in detail.

In this embodiment, by arranging the fourth electrode trace 414 in the pixel electrode region 102, the fourth electrode trace 414, the second electrode trace 412, and the first electrode trace 411 can collectively form the "I"-shaped common electrode layer 400. A more regular and uniform electric field can be formed between the "I"-shaped common electrode layer 400 and the pixel electrode, thereby providing a more stable and uniform pixel voltage for the subpixels and further improving the display effect.

Figure 11:
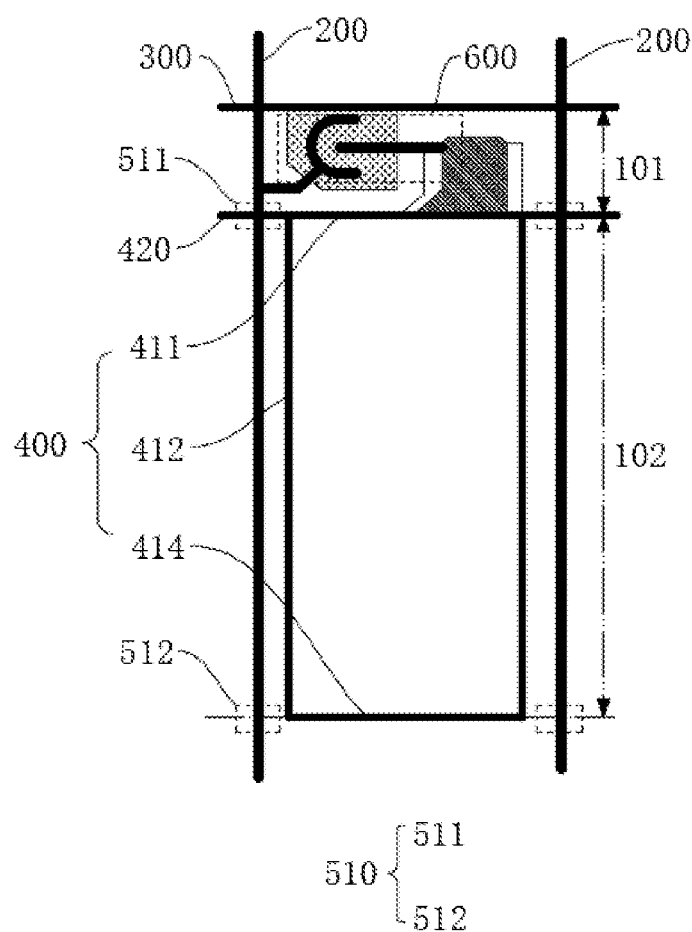
FIG. 11 is a schematic structural view of a tenth type of pixel of the array substrate of the present application.

Referring to FIG. 11, which is a schematic structural view of a tenth type of pixel of the array substrate of the present application, in this embodiment, when the number of the second electrode traces 412 is two, first ends of the second electrode traces 412 may be connected to two ends of the first electrode trace 411 in the first direction, respectively, and second ends of the two second electrode traces 412 away from the first electrode trace 411 may be connected to two ends of the fourth electrode trace 414, respectively. In this case, the first electrode trace 411, the two second electrode traces 412, and the fourth electrode trace 414 may form a rectangular frame-shaped common electrode layer 400. Compared with the "horizontal line-shaped" and the cross-shaped common electrode layers 400, the rectangular frame-shaped common electrode layer 400 has greater uniformity of the electric field.

In this embodiment, in the first direction, the fourth electrode traces 414 of adjacent two of the common electrode layers 400 may be separately disposed, and at least one of the active layers 510 is located between the fourth electrode traces 414 of the adjacent two of the common electrode layers 400. That is, each of the common electrode layers 400 may be rectangular frame-like in shape, and the adjacent two of the common electrode layers 400 are connected only through the electrode connection portion 420 located in the thin-film transistor region 101.

In this embodiment, through the above arrangement, connection positions of the adjacent two of the common electrode layers 400 are reduced from two to one, thereby reducing a number of the overlapping position of the second active layer 510 with the common electrode layers 400 and the data line 200. In this manner, while reducing influence of the coupling capacitance, the uniformity of the electric field of the common electrode layers 400 can also be ensured.

An embodiment of the present application further provides a display panel, and the display panel may include an opposite substrate, a liquid crystal layer, and the array substrate described in the aforementioned embodiments. The opposite substrate may be a color filter substrate. The array substrate and the opposite substrate are arranged at a distance from each other, and the liquid crystal layer is arranged between the array substrate and the opposite substrate. In this embodiment, the display panel can be applied to smart display devices including, but not limited to, televisions, computers, and mobile phones.

In the embodiment of the present application, by removing part of the common electrode layer 400 on the array substrate, the number of overlapping positions of the orthographic projections of the common electrode layer 400 and the active member 510 is reduced, thereby reducing the asymmetry of the coupling capacitance between the active layer 510 and the common electrode layer 400 and the data line 200 when displaying the positive and negative frames, and effectively alleviating the horizontal crosstalk problem caused by the difficulty in cancelling the coupling capacitance when displaying the positive and negative frames.

The array substrate and the display terminal provided by the embodiments of the present application are described in detail above. Specific examples are used in this article to illustrate the principles and implementation of the application, and the descriptions of the above examples are only used to help understand the methods and core ideas of the application; in addition, for those skilled in the art, according to the idea of the application, there will be changes in the specific implementation and the scope of application. In summary, the content of this specification should not be construed as a limitation of the application.

What is claimed is:

1. An array substrate, comprising a plurality of data lines and a plurality of scan lines, the data lines and the scan lines intersecting to form a plurality of subpixel units, each of the subpixel units comprising a thin-film transistor region and a pixel electrode region located on at least one side of the thin-film transistor region, wherein each of the subpixel units comprises:
a substrate;
a common electrode layer disposed on the substrate; and
an active layer arranged on a side of the common electrode layer and comprising at least one first active layer and a plurality of second active layers, wherein the first active layer is located in a thin-film transistor included in the array substrate;
wherein two of the data lines are respectively disposed on two sides of each subpixel unit, an orthographic projection of the second active layers projected on the substrate overlap with an orthographic projection of the data lines projected on the substrate,
wherein in each of the subpixel units, at least one of the second active layers is disposed at one side of the pixel electrode region away from the thin-film transistor region, nonoverlaps with positions where the common electrode layer and the data lines overlap, and projects onto the substrate an orthographic projection which is outside an orthographic projection of the common electrode layer projected on the substrate.

2. The array substrate of claim 1, wherein an electrode connection portion is disposed between the common electrode layers of adjacent ones of the subpixel units in a first direction, and the first direction is parallel to an extending direction of the scan lines.

3. The array substrate of claim 2, wherein the electrode connection portion is disposed close to the thin-film transistor.

4. The array substrate of claim 3, wherein an orthographic projection of at least one of the second active layers on the common electrode layer does not overlap the electrode connection portion.

5. The array substrate of claim 4, wherein the common electrode layer comprises a first electrode trace extending in the first direction and disposed close to the thin-film transistor.

6. The array substrate of claim 5, wherein the first electrode traces of adjacent ones of the common electrodes are connected through the electrode connection portion in the first direction.

7. The array substrate of claim 6, wherein the common electrode layer further comprises at least a second electrode trace extending in a second direction, and the second direction is parallel to an extending direction of the data lines.

8. The array substrate of claim 7, wherein the first electrode trace is connected to the second electrode trace.

9. The array substrate of claim 8, wherein the subpixel unit further comprises a pixel electrode layer disposed on the common electrode layer, and the second electrode trace is connected to a midpoint of the first electrode trace.

10. The array substrate of claim 9, wherein an orthographic projection of the second electrode trace on the pixel electrode layer falls within the pixel electrode layer.

11. The array substrate of claim 10, wherein the common electrode layer further comprises a third electrode trace extending in the first direction.

12. The array substrate of claim 11, wherein an orthographic projection of the third electrode trace on the pixel electrode layer falls within the pixel electrode layer.

13. The array substrate of claim 12, wherein the third electrode trace and the second electrode trace are arranged to cross each other.

14. The array substrate of claim 13, wherein a midpoint of the third electrode trace coincides with a midpoint of the second electrode trace.

15. The array substrate of claim 7, wherein the common electrode layer further comprises a fourth electrode trace extending in the first direction, and the fourth electrode trace is connected to at least one of the second electrode traces.

16. The array substrate of claim 15, wherein the fourth electrode trace is disposed away from the thin-film transistor, and opposite ends of the fourth electrode trace do not overlap the data line.

17. The array substrate of claim 16, wherein a number of the second electrode traces is two, and the two second electrode traces are electrically connected to opposite ends of the first electrode trace, respectively.

18. The array substrate of claim 17, wherein opposite ends of the fourth electrode trace are connected to ends of the two second electrode traces away from the first electrode trace, respectively.

19. The array substrate of claim 7, wherein a width of the first electrode trace in the second direction is less than a width of the second electrode trace in the first direction.

20. A display panel, comprising an opposite substrate, a liquid crystal layer, and the array substrate of claim 1, wherein the array substrate and the opposite substrate are arranged at a distance from each other, and the liquid crystal layer is arranged between the array substrate and the opposite substrate.

* * * * *